3,743,639
OPTICAL BRIGHTENER OF THE COUMARINYL-
STYRYLTRIAZOLE SERIES
Hans Schlapfer, Basel, Switzerland, assignor to Ciba-
Geigy Corporation, Ardsley, N.Y.
No Drawing. Filed July 8, 1970, Ser. No. 53,302
Int. Cl. C07d 55/02
U.S. Cl. 260—240 D     1 Claim

ABSTRACT OF THE DISCLOSURE

2-[3-phenylcoumarinyl-(7)] - 4 - m-chlorostyryl-v-triazole is used as brightener of organic materials. The compound is prepared by splitting off water from isonitroso-m-chlorobenzalacetone - [3 - phenylcoumarinyl-(7)]-hydrazone.

DESCRIPTION OF THE INVENTION

The object of the invention is the optical brightener: 2-(3-phenylcoumarin-7-yl) - 4 - chlorostyryl-v-triazole, a process for the production thereof, as well as the use thereof for the optical brightening of organic materials, particularly polyesters.

Compounds of the phenylcoumarinyltriazole series, e.g. 2-(3-phenylcoumarin-7-yl)-4-styryl-v-triazole, are already known, from the Dutch patent application 6800021, as optical brighenters possesing good properties. The brightener according to the invention appreciably surpasses these known brighteners with regard to the level of the degree of whiteness which it is able to impart to the substrates; also with regard to the brightening effect and the neutral shade.

It is distinguished by good compatibility with high-molecular organic substances, and is suitable for the brightening of high-molecular materials such as polyolefins, e.g. polyethylene or polypropylene, also polyvinyl chloride, particularly, however, polyesters, especially polyesters of aromatic polycarboxylic acids with polyvalent alcohols such as polyterephthalic glycol ester, synthetic polyamides such as nylon–6 and nylon–66, but also cellulose esters such as cellulose acetates, and also for the brightening of cellulose.

The optical brightening of the high-molecular, colourless, organic material is performed, for example, by incorporating into this material small amounts of the optical brightener according to the invention, preferably 0.001 to 1% relative to the material to be brightened, optionally together with other additives such as softeners, stabilisers or pigments. The brightener can be worked into the synthetic materials, e.g. dissolved in softeners such as dioctylphthalate, or together with stabilisers such as dibutyl tin laurate or sodium pentaoctyl tripolyphosphate, or together with pigments such as, e.g. titanium dioxide. Depending on the nature of the material to be brightened, the brightener may also be dissolved in the monomers before polymerisation, in the polymer mass, or together with the polymers in a solvent. The material pre-treated in this manner is afterwards processed into the desired ultimate form by methods known per se, such as calendering, pressing, extrusion, coating, moulding and, in particular, by spinning and stretching. The brighteners can also be worked into finishings, e.g. into finishings for textile fibres such as polyvinyl alcohol, or into resins or resin pre-condensates such as, e.g. methylol compounds of ethylene urea, which are used for the treatment of textiles.

Preferably, colourless, high-molecular, organic material is brightened also in the form of fibres.. For the brightening of these fibre materials, a dispersion or solution of the brightener is advantageously used. The brightener dispersion or solution preferably has a content of 0.005–0.5% of v-triazole according to the invention, relative to the fibre material. In addition, the dispersion or solution can contain auxiliaries such as dispersing agents, e.g. condensation products of fatty alcohols or alkyl phenols containing 10 to 18 carbon atoms, with 15 to 25 moles of ethylene oxide, or condensation products of alkylmono- or polyamines containing 16 to 18 carbon atoms, with, at least, 10 moles of ethylene oxide, organic acids such as formic, oxalic or acetic acid, detergents, swelling agents such as di- or trichlorobenzenes, wetting agents such as sulphosuccinic acid alkyl ester, bleaching agents such as sodium chlorite, peroxides or hydrosulphites, as well as, optionally, brightening agents of other classes such as, e.g. derivatives of stilbene having affinity to cellulose.

The brightening of the fibre material with the aqueous brightener-treatment-bath is carried out either by the exhaust process, at temperatures of preferably 30 to 150° C., or by the padding process. In the latter case, the material is impregnated, e.g. with a 0.2–0.5% brightener preparation, and finished, e.g. by a dry or moist heat treatment, e.g. by steaming under 2 atmospheres pressure or, after a drying treatment, by a short dry heating to 180–220° C., whereby the fabric is simultaneously thermofixed. The thus treated fibre material is finally rinsed and dried.

Colourless, high-molecular, organic material optically brightened according to the invention, particularly the synthetic fibre material brightened in the exhaust process, has a pleasing, pure white, blue-violet to bluish fluorescent appearance; such material dyed in light shades and brightened according to the invention is distinguished by a pure shade.

The brightener can also be added to detergents and these used for the brightening of textiles.

The content of optical brightener in the detergents is advantageously 0.001–0.5%, relative to the solid content in the detergent.

Washing liquors containing the brightener according to the invention impart, during washing, to the textile fibres treated thereiwth, e.g. cellulose fibres or synthetic polyamide, polyester, polyolefin and cellulose ester fibres, a brilliant appearance in daylight. It can be used therefore, in particular, for the washing of these synthetic fibres or of the textiles or component parts of textiles made from such fibres, or for the washing of household linen goods.

The brightener is produced by splitting off one mole of water from a compound of the Formula II or II',

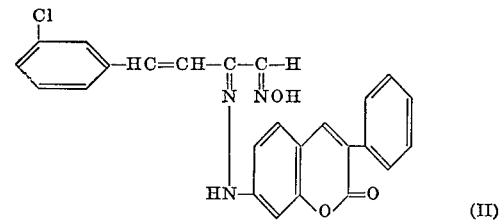

(II)

or

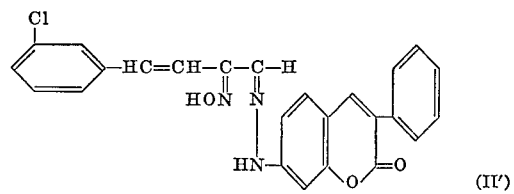

(II')

under the action of an acid reacting condensation agent, optionally with heating.

Examples of acid reacting condensation agents are the hydrohalic acids, the inorganic anhydrides, phosphorus pentoxide and sulphur trioxide, the mixed inorganic/organic anhydrides such as the alkynoyl and aroyl, alkylsulphonyl and arylsulphonyl halides, e.g. acetyl chloride, benzoyl chloride, toluene sulphochloride, as well as the purely organic anhydrides such as acetanhydride, benzoic acid anhydride, also the mixed anhydride of formic acid and acetic acid.

The condensation can be performed in the presence of organic solvents which are inert under the reaction conditions. Suitable as such are high-boiling hydrocarbons and halogenated hydrocarbons, e.g. chlorobenzene, dichlorobenzenes, xylenes; it is also possible to use inert, slightly or more strongly basic solvents, e.g. dimethylformamide, dimethylacetamide, or pyridine, picolines, quinolines. Suitable reaction temperatures for ring closure are those between room temperature and 250° C., preferably 100–150° C. Favourable results with regard to yields and purity of the final products are produced by the presence of basic catalysts such as anhydrous alkali metal salts or alkaline-earth metal salts of organic acids, e.g. sodium acetate or potassium acetate. The progression of the ring-closure reaction can be best followed in thin-layer chromatograms. The intermediary occurrence, when mixed inorganic/organic or purely organic acid anhydrides are used, of O-acylated intermediate stages is only of minor importance with regard to the course of the reaction.

As a modification of the process just described, the brightener is also obtained by ring closure being produced oxidatively in a compound of the Formula II or II′, and the obtained v-triazole-1-oxide compound being reduced with nascent hydrogen to 2-(3-phenylcoumarin-7-yl)-4-m-chlorostyryl-v-triazole.

Oxidative ring closure can be effected by the action of the most diverse oxidising agents, whereby it is advisable to operate in solvents which are resistant to oxidation. In acid solution, e.g. acetic acid solution, bichromate or hydrogen peroxide are suitable oxidising agents; in basic solvents, such as pyridine or pyridine/water mixtures, potassium ferricyanide is, for example, suitable. The generally applicable and therefore preferred process consists in oxidation with copper-(II)-sulphate in pyridine/water. It is not necessary thereby for stiochiometric amounts of copper to be used, since the monovalent copper formed during the reaction can be continually converted, by the blowing in of air or oxygen, again into the bivalent stage.

For the reduction of triazole oxides to the triazoles using known methods, the reduction with base metals and acids, such as zinc dust in acetic acid or in acetic acid/water mixtures is advantageously chosen. It is also possible to use for the reduction, however, salts of reducing acids of sulphur or phosphorus.

The starting materials for the production process or the modified process according to the invention can be obtained in a known manner.

In the following examples the temperatures are given in degrees centigrade.

EXAMPLE 1

2-[3-phenylcoumarinyl-(7)]-4-m-chlorostyryl-v-triazole

To a suspension of 25.2 g. of 3-phenyl-7-hydrazino-coumarin in a mixture of 800 ml. of methanol and 200 ml. of 50% acetic acid are added, at room temperature, 22.5 g. of m-chlorobenzal-isonitroacetone; and the reaction mixture is stirred for 2 hours at room temperature and subsequently for 6 hours at 50–55°. After cooling, the orange-red oxime hydrazone is filtered off under suction, washed three times with 50 ml. of methanol each time, and dried in vacuo at 60–70°. In this manner are obtained 36.0 g. of crude isonitroso-m-chlorobenzalacetone-[3-phenylcoumarinyl-(7)]-hydrazone in the form of orange-red crystal powder which melts at 206–209° with decomposition.

33.3 of the above obtained oxime hydrazone with 22.5 g. of anhydrous potassium acetate in 330 ml. of acetic anhydride are heated, with the exclusion of moisture and with stirring, within half an hour to 89–95°, and held at this temperature for half an hour. The reaction temperature is afterwards raised to 130–135°, and maintained there for a further 4½ hours. After cooling, the crystalline precipitate is filtered off with suction, washed three times with 50 ml. each time of 50% acetic acid, and then with water, and dried. After a pre-purification from chlorobenzene by means of dissolving and crystallising with subsequent recrystallisation from chlorobenzene with bleaching earth, 19.5 g. of 2-[3-phenylcoumarinyl-(7)1-4-m-chlorostyryl-v-triazole are obtained in the form of slightly yellow crystals, M.P. 213–214°.

The new v-triazole dissolves in organic solvents with an extremely intense blue-violet fluorescence in daylight, and is able to impart an excellent brightness to polyester fibres in the exhaust and thermosol processes, as well as when contained in the spinning mass. It is likewise suitable for imparting to polyamide, 2½ acetate, triacetate and polyacrylonitrile fibres a brilliant whiteness.

EXAMPLE 2

To 100 ml. of water are added 0.2 g. of trichlorobenzene and to this is added a solution of 0.0015 g. of the brightener described in Example 1 in 1.5 ml. of ethylene glycol monomethyl ether. The thus obtained liquor is heated to 60°, and 3 g. of a polyester fabric are introduced. The temperautre is raised within 10–15 minutes to 95–98° and this temperature is maintained for 1 hour. The fabric is then rinsed for 2 minutes in running water, and subsequently dried for 20 minutes at 60°. The fabric treated in this manner has a white, brilliant appearance.

EXAMPLE 3

To 100 ml. of water are added 0.2 g. of trichlorobenzene, 0.2 g. of 80% sodium chlorite, 0.2 g. of sodium nitrate and 0.2 g. of oxalic acid, or an equivalent amount of another organic or inorganic acid suitable for this purpose. A stock solution is prepared of the brightener produced according to Example 1 by dissolving 1 g. of the stated brightener in 1000 ml. of ethylene glycol monomethyl ether. An amount of 1.5 ml. of this stock solution is added to the above described solution. This liquor is heated to 60°; then 3 g. of a polyester fabric are introduced, and the temperature is raised in the course of 15–20 minutes to 95–98°; the bath is left at this temperature for 60 minutes. The fabric is thereupon rinsed and dried. The thus treated fabric has a white, brilliant appearance.

EXAMPLE 4

To 290 ml. of water are added 0.3 ml. of alkylpolyglycol ether and 0.15 ml. of trichlorobenzene. A solution of the optical brightener according to Example 1 is produced by dissolving 1 g. thereof in 1000 ml. of ethylene glycol monomethyl ether. An amount of 4.5 ml. of this stock solution is added to the above described solution. The liquor is heated to 60°, and 15 g. of polyester fabric are then introduced into the solution. The temperature is raised within 15–20 minutes to 130° and this temperature is maintained for 30 minutes. The bath is cooled within 10–15 minutes to 60°; the fabric is rinsed, dried for 20 minutes at 60, and afterwards thermofixed for 30 seconds at 200°. The thus treated fabric has a white, brilliant appearance.

EXAMPLE 5

To 100 ml. of water are added 0.4 g. of a detergent. A solution is prepared of the optical brightener according to Example 1 by dissolving 1 g. thereof in 1000 ml. of ethylene glycol monomethyl ether. An amount of 2 ml. of this stock solution is added to the above described liquor; this is then heated to 60°, and 3 g. of nylon fabric are introduced into the solution. The fabric is treated at this temperature for 30 minutes. After rinsing and drying, the fabric has a brilliant, white appearance.

EXAMPLE 6

To 100 ml. of water are added 0.12 ml. of 85% formic acid and 0.06 g. of alkylpolyglycol ether. A solution is prepared of the optical brightener according to Example 1 by dissolving 1 g. thereof in 100 ml. of ethylene glycol monomethyl ether. An amount of 1.5 ml. of this stock solution is added to the above described aqueous solution. This aqueous solution containing the brightener is heated to 60°; then 3 g. of "Orlon" fabric are introduced into the solution. The temperature is raised within 10–15 minutes to 95–98° and this temperature is maintained for 60 minutes. The fabric is then rinsed and dried.

The thus treated fabric has a white, brilliant appearance.

EXAMPLE 7

To 100 ml. of water are added 0.06 ml. of 40% acetic acid and 0.06 ml. of alkylpolyglycol ether. A solution is prepared of the optical brightener according to Example 1 by dissolving 1 g. thereof in 1000 ml. of dimethylformamide. An amount of 6 ml. of this stock solution is added to the above described aqueous solution. This aqueous solution containing the brightener is heated to 40°; then 3 g. of acetate fabric are introduced into the solution. The temperature is raised within 10–15 minutes to 75–80°, and this temperature is maintained for 30 minutes. The fabric is rinsed and dried. The thus treated fabric has a white, brilliant appearance.

EXAMPLE 8

To 100 ml. of water are added 0.06 ml. of 40% acetic acid and 0.06 g. of alkylpolyglycol ether. A solution is prepared of the optical brightener according to Example 1 by dissolving 1 g. thereof in 1000 ml. of dimethylformamide. An amount of 1.5 ml. of this stock solution is added to the above described aqueous solution. This liquor is heated to 60°; then 3 g. of polypropylene fabric ("Meraklon") are introduced into this solution. The temperature is raised within 10–15 minutes to 95–98° and this temperature is maintained for 30 minutes. The fabric is rinsed and dried. The thus treated fabric has a white and brilliant appearance.

EXAMPLE 9

To 95 ml. of water are added 0.06 ml. of 40% acetic acid and 0.06 ml. of alkylpolyglycol ether. A solution is prepared of the optical brightener according to Example 1 by dissolving 1 g. thereof in 1000 ml. of dimethylformamide. An amount of 6 ml. of this stock solution is added to the above described aqueous solution. This aqueous solution containing the optical brightener is heated to 60°; then 3 g. of triacetate fabric are introduced into the solution. The temperature is raised within 10–15 minutes to 95–98° and this temperature is maintained for 30 minutes. The fabric is rinsed and dried. The thus treated fabric has a white and brilliant appearance.

EXAMPLE 10

100 parts of polyproypylene with 0.5 g. of titanium dioxide and 0.05 g. of the optical brightener according to Example 1 are homogenised at 200° in a kneading machine. Under inert gas at 2–3 atm. and at a temperature of 280–300°, the melt is spun, by known methods, through spinning nozzles. The thus obtained polypropylene threads are distinguished by a high degree of whiteness.

EXAMPLE 11

1000 parts of polyester granulate made from polyterephthalic acid ethylene glycol are intimately mixed with 0.25 part of the brightener produced according to Example 1; and the mixture is then spun under nitrogen from an extruder at a temperature of 265–285°, in a known manner, through a spinning-nozzle into threads. The thus obtained polyester threads have a brilliant white appearance.

EXAMPLE 12

In a high-grade alloy steel autoclave provided with a stirrer, a gas-inlet tube, a vacuum arrangement, a descending condenser, and a heating jacket, 388 g. of benzene-1,4-dicarboxylic acid dimethyl ester, 300 g. of 1,2-ethanediol and 0.4 g. of antimonous oxide are heated, whilst pure nitrogen is blown through, to 200° external temperature, and held for 3 hours at this temperature, whereby methanol slowly distills off. With the exclusion of air, 0.4 g. of the optical brightener according to Example 1, dissolved in 40 g. of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly being reduced to 0.2 torr; and condensation is completed during 3 hours under these conditions. Vigorous stirring is maintained during this operation. The liquid condensation polymer is then extruded with nitrogen through the nozzle in the base. From the thus obtained polymer, monofilaments having a brilliant white appearance can be produced.

EXAMPLE 13

To 100 ml. of water are added 0.2 g. of sodium nitrate, 0.2 g. of sodium chlorite and 0.2 g. of oxalic acid. A solution is prepared of the optical brightener according to Example 1 by dissolving 3.7 g. thereof in 1000 ml. of water. An amount of 2 ml. of this stock solution is added to the above described solution. This aqueous solution containing the brightener is heated to 40°; then 3 g. of desized, unbleached cotton fabric are introduced into the solution. The temperature is raised within 10–15 minutes to 85°, and the liquor is held at this temperature during 60 minutes. The fabric is then rinsed in cold running water, and subsequently dried for 20 minutes at 60°.

The thus treated fabric has a pleasing white appearance.

Instead of oxalic acid, it is also possible to use an equivalent amount of another organic, or also inorganic acid.

What I claim is:

1. Compound of the Formula I:

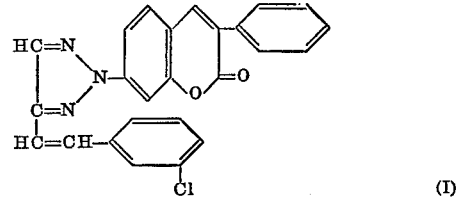

(I)

References Cited

Netherlands Published Application No. 6880021 16 pages, published July 8, 1968.

JOHN D. RANDOLPH, Primary Examiner

U.S. Cl. X.R.

117—33.5 T; 252—301.2 W, 543; 260—37 P, 37 NP, 39 P, 40 P, 41 C, 69 R, 75 R, 78 R, 88.7, 240 R